United States Patent
Brisson et al.

(10) Patent No.: US 6,788,833 B1
(45) Date of Patent: Sep. 7, 2004

(54) METHOD AND SYSTEM FOR SUPPRESSING SIGNAL DISTORTIONS ASSOCIATED WITH NONLINEARITY IN OPTICAL FIBERS

(75) Inventors: Caroline Brisson, Vieux Reng (FR); René-Jean Essiambre, Red Bank, NJ (US); Robert M. Jopson, Rumson, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/413,967

(22) Filed: Apr. 15, 2003

(51) Int. Cl.[7] .................. G02F 1/035; H04J 14/02
(52) U.S. Cl. ............. 385/3; 385/1; 385/2; 385/122; 398/81; 398/82
(58) Field of Search ................... 385/1, 2, 3, 122, 385/123, 88; 398/81, 82

(56) References Cited

U.S. PATENT DOCUMENTS 5,532,868 A * 7/1996 Gnauck et al. ............ 359/332
5,745,613 A * 4/1998 Fukuchi et al. ............ 385/24
5,798,853 A * 8/1998 Watanabe .................. 398/150
6,304,348 B1 * 10/2001 Watanabe ................... 398/9

OTHER PUBLICATIONS

"New Optical Star LAN Demonstrator Based on FDM With an Adapted Multichannel Ethernet Protocol", Brisson et al., Proceedings of SPIE, All–Optical Networking: Architecture, Control, and Management Issues, pp. 164–171, Boston, Nov. 1998.

* cited by examiner

Primary Examiner—Brian M. Healy

(57) ABSTRACT

A method and system for suppressing signal distortions in optical signals associated with nonlinearity in optical fibers includes propagating an optical signal through a transmission medium, the transmission medium comprising a sufficiently low dispersion such that a nonlinear distortion imparted on the propagating optical signal by the transmission medium is imprinted primarily on an optical field phase of the optical signal, and converting the propagated optical signal to an electrical signal such that the optical field phase information of the optical signal is not translated into the electrical domain.

20 Claims, 7 Drawing Sheets

METHOD AND SYSTEM FOR SUPPRESSING SIGNAL DISTORTIONS ASSOCIATED WITH NONLINEARITY IN OPTICAL FIBERS

FIELD OF THE INVENTION

This invention relates to the field of optical transmission systems and, more specifically, to densely packed optical transmission systems.

BACKGROUND OF THE INVENTION

The optical power transmitted through an optical transmission fiber of an optical transmission system is limited by fiber nonlinearity (e.g., self-phase modulation, SPM, cross-phase modulation, XPM, and four-wave mixing, FWM) in optical transmission systems. XPM and FWM become particularly important when optical channels are densely packed. More specifically, FWM, also referred to as four-photon mixing, limits the optical power transmitted through an optical transmission system with very small channel spacing. As the wavelength separation between channels in a WDM network is designed to be smaller, the severity of FWM penalties associated with closely spaced channels increases dramatically. This effect restricts the allowable wavelength separation of channels carrying data and, therefore, also limits the number of allowable channels within a WDM network.

Four-wave mixing occurs when two or more optical waves create a beat frequency whose oscillation modulates the refractive index of the optical fiber. This process generates sidebands that produce crosstalk in the neighboring channels and lead to signal impairments. The magnitude of the FWM impairment for a given fiber is a function of the wavelength separation between interacting channels, the power in each channel, and the phase matching efficiency.

Several methods have been suggested to reduce or minimize FWM impairments associated with closely located channels. For example, phase matching, which is related to the magnitude of the FWM efficiency, can be decreased through the use of a high dispersion fiber. Although high dispersion within a fiber would decrease the phase matching and correspondingly decrease the FWM impairments, high dispersion within a fiber imposes additional penalties such as pulse distortion over long distances. High-dispersion fibers may also additionally require the use of dispersion-compensating fibers to reduce accumulated dispersion.

Alternatively, because impairments from FWM are a function of the signal power in each channel, reducing the signal power or field amplitude for each channel has also been suggested. Because the power of the optical sidebands generated is proportional to the product of three individual component powers, FWM impairments can be greatly reduced by reducing field amplitudes. The signal power per channel, however, can only be reduced to a certain minimum level as dictated by the optical signal-to-noise ratio (OSNR) limit for the system. If the signal power per channel is decreased below the minimal level, the signal power compared to the noise power may not be sufficient to maintain an acceptably low bit error rate (BER). For traditional fiber systems with non-return-to-zero (NRZ) modulation and optical amplification, the signal power for each channel typically cannot be made sufficiently low to avoid FWM impairments for small channel spacing. Thus, traditional fiber systems avoid FWM penalties by increasing the wavelength separation between channels or use of a fiber type with large dispersion.

The above design modifications all suffer the same shortcoming, though. As one system parameter is adjusted to reduce FWM impairments, other system parameters are affected which prevent the simultaneous reduction of wavelength separation between channels and the reduction of FWM impairments. Thus, current design techniques limit the allowable minimum wavelength separation between channels.

SUMMARY OF THE INVENTION

The present invention advantageously provides a method and system for the suppression of nonlinear signal distortions, such as, self-phase modulation (SPM), cross-phase modulation (XPM), and four-wave mixing (FWM), associated with the propagation of a dense wavelength-division multiplexed (DWDM) optical signal or with the propagation of an optical signal via a low dispersion fiber.

In one embodiment of the present invention, a method for suppressing signal distortions in optical signals associated with nonlinearity in optical fibers includes propagating an optical signal through a transmission medium, the transmission medium comprising a sufficiently low dispersion such that a nonlinear distortion imparted on the propagating optical signal by the transmission medium is imprinted primarily on an optical field phase of the optical signal, and converting the propagated optical signal to an electrical signal such that the optical field phase information of the optical signal is not translated into the electrical domain. Alternatively, the method further includes electrically filtering each channel of said converted electrical signal at a respective intermediate frequency of said each channel.

In another embodiment of the present invention, a system for suppressing nonlinear distortions in an optical signal includes an optical oscillator for producing an optical oscillation signal, the optical oscillation signal being co-propagated with the optical signal, a transmission medium for propagating the optical oscillation signal and the optical signal, and an optical-to-electrical converter for converting the propagated optical oscillation signal and the optical signal to electrical signals, the optical-to-electrical converter comprising a bandwidth inclusive of all of the wavelengths of said optical signals.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a method and system for the suppression of nonlinear signal distortions, such as self-phase modulation (SPM), cross-phase modulation (XPM), and four-wave mixing (FWM), associated with the propagation of a dense wavelength-division multiplexed (DWDM) optical signal or low dispersion fiber. Although the concepts of the present invention will be described within the context of an optical passive star local area network (LAN), the present invention may be advantageously employed within various other networks or systems wherein the suppression of nonlinear effects associated with the propagation of an optical signal through low dispersion fiber or relatively short high-dispersion fiber is desirable.

Figure 1:
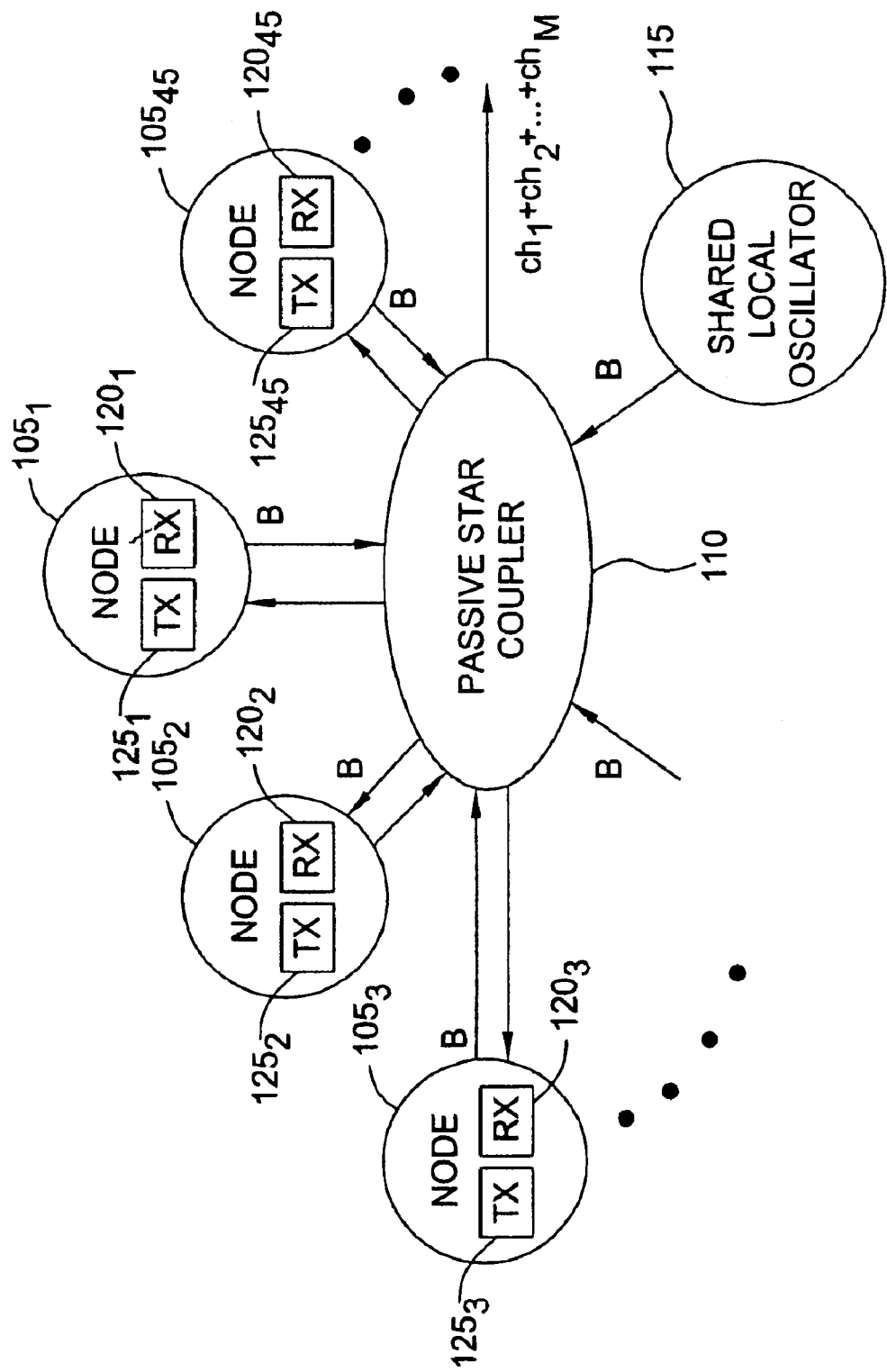
FIG. 1 depicts a high level block diagram of a passive star local area network including an embodiment of the present invention.

FIG. 1 depicts a high level block diagram of a passive star LAN including an embodiment of the present invention. The passive star LAN 100 of FIG. 1 comprises a plurality of nodes (illustratively 45 nodes) $105_1$–$105_{45}$ (collectively nodes 105), a passive star coupler 110, and a co-propagating shared local oscillator 115 injected from the passive coupler. Each of the nodes 105 comprises a respective receiver $120_1$–$120_{45}$ (collectively, receivers 120) and a respective transmitter $125_1$–$125_{45}$ (collectively, transmitters 125).

Each of the nodes $105_1$–$105_{45}$ is connected to the passive star coupler 110 via two optical fibers. A first of the optical fibers is used to launch data from a node onto the LAN network 100 at a bit rate B on a channel $ch_x$ of a set of M available channels, where M≦N. The second of the optical fibers is used to simultaneously receive a signal from the shared local oscillator 115 and data incoming from other nodes of the LAN network 100.

Figure 2:
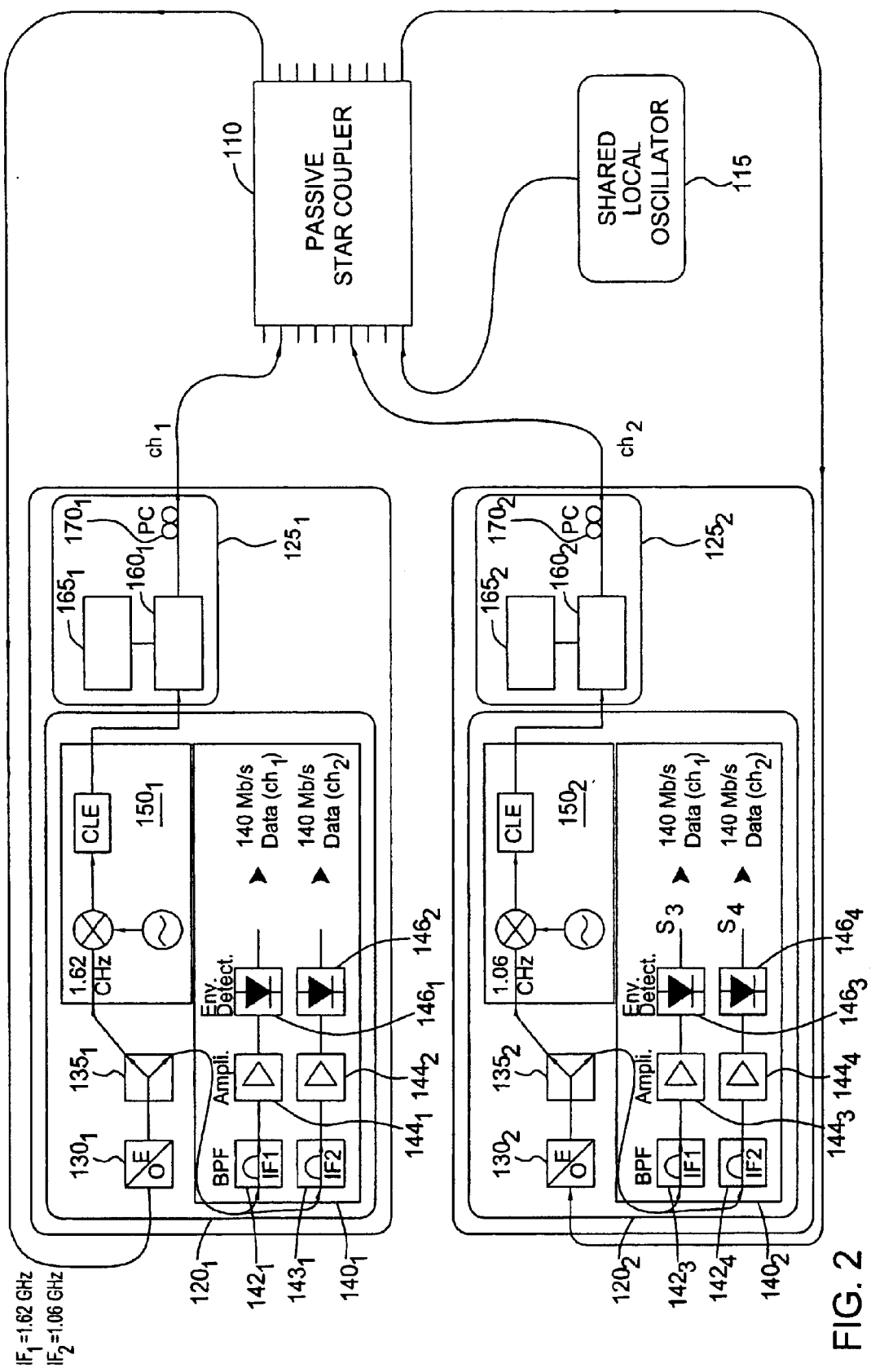
FIG. 2 depicts a block diagram of the LAN network of FIG. 1 including a more detailed block diagram of the respective receivers and the respective transmitters of two nodes.

FIG. 2 depicts a block diagram of the passive star LAN 100 of FIG. 1 including a more detailed block diagram of the respective receivers $120_1$, $120_2$ and the respective transmitters $125_1$, $125_2$ of the nodes $105_1$, $105_2$. All of the nodes 105 of the LAN network 100 of FIG. 1 comprise substantially the same components and, as such, the function and composition of the nodes 105 of the LAN network 100 will be described with respect to the nodes $105_1$ and $105_2$.

Each of the receivers $120_1$, $120_2$ of the nodes $105_1$, $105_2$ comprises a respective optical to electrical converter (illustratively a photodetector) $130_1$, $130_2$ and a respective signal splitter $135_1$, $135_2$ followed by a data recovery unit $140_1$, $140_2$ and a locking unit $150_1$, $150_2$. Each of the transmitters $125_1$, $125_2$ comprises a respective tunable laser (illustratively a tunable Nd:YAG laser) $160_1$ and $160_2$, a respective modulator $165_1$ and $165_2$, and a respective polarization controller (PC) $170_1$ and $170_2$.

Each of the data recovery units $140_1$, $140_2$ comprises a set of signal paths (illustratively two signal paths) $S_1$, $S_2$, $S_3$ and $S_4$, one for each available channel $ch_x$. Each of the signal paths $S_1$, $S_2$, $S_3$ and $S_4$ comprises a respective electrical bandpass filter $142_1$, $142_2$, $142_3$ and $142_4$ centered at the intermediate frequency $IF_1$ and $IF_2$ of the respective input channels (illustratively $ch_1$ and $ch_2$). The signal paths $S_1$, $S_2$, $S_3$ and $S_4$ each further comprise a respective amplifier $144_1$, $144_2$, $144_3$ and $144_4$ and a respective detector (illustratively an envelope detector) $146_1$, $146_2$, $146_3$ and $146_4$. The respective locking units $150_1$, $150_2$ of the receivers $120_1$, $120_2$ each comprise respective locking electronics. To transmit data, a node 105 tunes its tunable laser 160 to an emitting channel $ch_x$ of the available M channels. The output of the tunable laser 160 is modulated by the modulator 165 (illustratively at a bit rate per user B=140 Mb/s). The modulated data is then launched into the passive star coupler 110, where the data is combined with the signal from the shared local oscillator 115. The polarization of the data signals transmitted from the nodes 105 is adjusted by the polarization controller 170 to match the polarization state of the signal from the shared local oscillator 115. The inventors determined that the shared local oscillator 115 allows a large number of optical channels to be detected simultaneously by using direct photodetection followed by electrical bandpass filtering of the beat signal between the signal from the shared local oscillator 115 and the optical channels of a data signal. In accordance with the present invention, a signal from the shared local oscillator 115 is co-propagated with the data signals from the nodes to allow cancellation of the effects of fiber nonlinearity at photodetection, which is explained in detail below. Furthermore, and in accordance with the present invention, the local oscillator 115 is a shared oscillator among all of the optical channels, which minimizes system cost.

Although in FIG. 1 the concepts of the present invention are being described within the context of propagating a data signal with a co-propagating oscillation signal, the concepts of the present invention are applicable to systems and situations wherein a co-propagating oscillation signal is not needed. For example, in the passive star LAN 100, for single-channel transmission, a node 105 transmits data intended for another node 105 through the passive star coupler 110. At the receiving node 105, the photodetector 130 of the receiver 120 converts the input optical data (optical signal) into an electrical signal such that the optical field phase information of the optical signal is not translated into the electrical domain. In such an embodiment, the conversion of the received optical data into an electrical signal in accordance with the present invention in conjunction with the propagation of the optical data through an optical fiber such that nonlinear distortion is imparted on primarily the optical field phase of the optical signal (described in greater detail below), results in the suppression of signal distortions typically associated with the transmission of an optical signal through non-linear optical fibers. As such, in such embodiments of the present invention, the single-channel optical signal does not need to be co-propagated with the oscillation signal.

In the passive star LAN 100 of FIG. 1, the transmitted data from each of the nodes 105 and the signal of the shared local oscillator 115 are wavelengtgh division multiplexed (WDM) and simultaneously carried on all of the output fibers of the passive star coupler 110. The transmitted data from each of the nodes 105 comprises channels falling within the bandwidth of each of the photodetectors 130 of the nodes 105, such that all of the transmitted channels from each of the nodes 105 can be simultaneously detected by each of the photodetectors 130 with no need for optical filtering.

An optical signal from one node 105 intended for another node 105 is communicated through the passive star coupler 110 via low dispersion fiber. In the passive star coupler 110, the optical signal from the transmitting node 105 is combined with an oscillation signal from the local oscillator 115. The combined optical signal is communicated to the receiver 120 of the receiving node 105 via low dispersion fiber where the photodetector 130 converts the input optical signal into an electrical signal such that the optical field phase information of the optical signal is not translated into the electrical domain. The electrical signal is directed in parallel to the locking unit 150 and to the data recovery unit 140. In the locking unit 150, the locking electronics stabilize the beat frequency between the tunable laser 160 in the transmitter 125 and oscillation signal from the shared local oscillator 115. In the data recovery unit 140, the electrical signal is electrically filtered by the respective electrical bandpass fillers 142 in each of the signal paths $S_n$. The respective electrical bandpass filter 142 of each signal path S is centered at the intermediate frequency, IF, of the channel $ch_x$ to be filtered. The filtered electrical signal is subsequently amplified, and the data in each of the signal paths $S_n$ recovered by the respective envelope detector 146.

In the passive star LAN 100 of FIG. 1 low dispersion fiber is used for the communication of optical signals between the nodes 105 and the passive star coupler 110 to avoid pulse distortions associated with the propagation of optical signals in high dispersion fibers over long distances. Although low-dispersion fibers facilitate the generation of various nonlinear distortions, the inventors determined that these nonlinear distortions, under certain conditions, are not translated into the electrical domain after detection. More specifically, low dispersion fibers are used for the communication of optical signals between the nodes 105 so the passive star coupler 110 such that any nonlinear distortion is imparted on primarily the optical field phase of the optical signal. As such and because a respective photodetector 130 of a respective receiver 120 of a receiving node 105 converts the input optical signal into an electrical signal such that the optical field phase information of the optical signal is not translated into the electrical domain, the signal distortion of a received optical signal associated with the nonlinearity of the transmitting optical fiber is substantially suppressed when a received optical signal is converted into an electrical signal in accordance with the present invention.

The effect of crosstalk is a key issue in the design of a multi-channel communication system, such as in the passive star LAN 100 of FIG. 1, since it limits the total capacity of a network. Crosstalk is defined as the transfer of power from one channel to another and is generally divided into two types; namely linear crosstalk and nonlinear crosstalk.

Linear crosstalk originates in a channel selection device, such as the electrical bandpass filters 142 of the passive star LAN 100, and depends on system parameters such as receiver power, bit rate, channel spacing, modulation format and bandpass filter response. Through experimentation, the inventors determined that when the channel spacing in the passive star LAN 100 is equal to four times the bit rate B (in this case B=140 MHz), linear crosstalk does not affect the performance of the communication system. That is, when the channel spacing is at least four times the bit rate, the power penalty due to linear crosstalk is negligible.

Nonlinear crosstalk is generally divided into two types; namely interchannel crosstalk and intrachannel crosstalk. Interchannel nonlinear crosstalk results from the nonlinear behavior of a photodetector, such as the photodetector 130 in the receiver 120. A photodetector experiences intermodulation noise when an optical signal carrying numerous closely spaced WDM channels is detected by the photodetector. To reduce the effects of interchannel nonlinear crosstalk, the channel spacing W of the passive star LAN 100 is again maintained at four times the bit rate 4 B=560 MHz, but the spacing between the shared local oscillator 115 and a first transmitted channel $W_{LO}$ is set at ten times the bit rate 10 B=1400 MHz (or 2.5 W, not an integer multiple of the channel spacing W). In addition, the bandwidth of the photodetectors 130 of the receivers 120 of the passive star LAN 100 must be sufficiently broadband so that all the transmitted channels can be simultaneously detected by the photodetectors 130 with no need for optical filtering. In the specific example, the photodetector bandwidth should be at least 26 GHz.

Figure 3B:
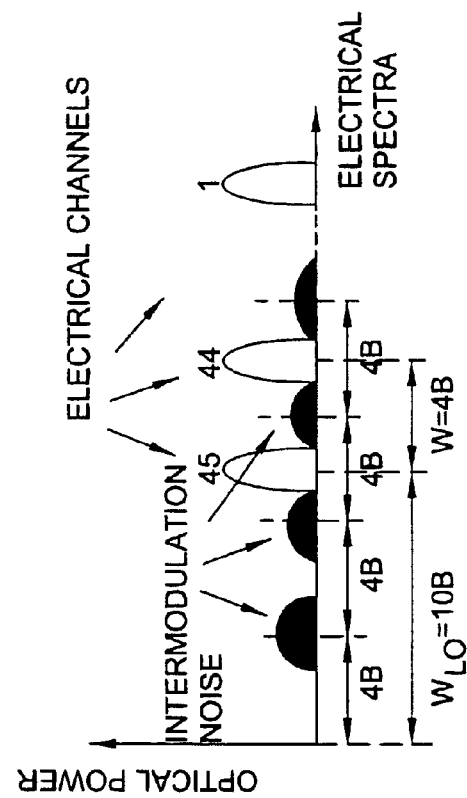
FIG. 3b graphically depicts an exemplary electrical spectra of an optical signal in a receiver of the passive star local area network of FIG. 1 after detection by a photodetector.
Figure 3A:
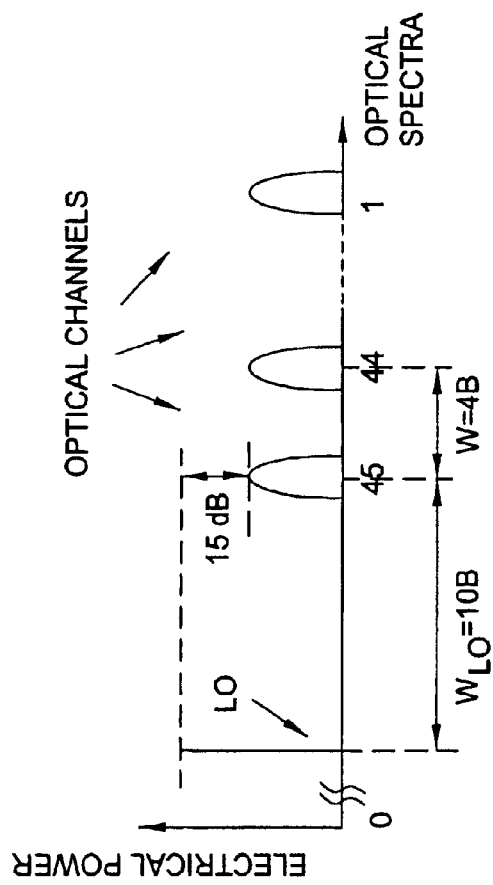
FIG. 3a graphically depicts the spacing in the optical domain of the optical channels and the oscillation signal from the co-propagating shared local oscillator (LO) passive star local area network of FIG. 1.

FIG. 3a graphically depicts the spacing in the optical domain of the 45 optical channels and the shared local oscillator 115 of the passive star LAN 100 of FIG. 1. As described above, the channels are spaced by four times the bit rate 4 B=560 MHz and the signal from the shared local oscillator 115 is located at ten times the bit rate 10 B=1400 MHz below the channel having the lowest frequency. FIG. 3b graphically depicts an exemplary electrical spectra of an optical signal in a receiver 120 of the passive star LAN 100 after detection by a photodetector 130. As evident from FIG. 3b, configuring the passive star LAN 100 as described above ensures that the wanted electrical channels are centered at the intermediate frequencies of the bandpass filters 142 of the receivers 120 of the passive star LAN 100. As such, the wanted electrical channels will be passed through the bandpass filters 142 and recovered by the envelope detectors 146. On the other hand, any intermodulation noise products will fall in between the wanted electrical channels and will be filtered out by the bandpass filters 142 and not detected by the envelope detectors 146.

The dominant nonlinearity in fibers (nonlinear intrachannel crosstalk) is the Kerr nonlinearity. Impairments from the instantaneous Kerr non-linearity, namely Self-Phase Modulation (SPM), Cross-Phase Modulation (XPM) and Four-Wave Mixing (FWM), are evaluated by solving numerically the generalized Nonlinear Schroedinger Equation (NSE) for the fiber linking the passive star coupler 110 to a node 105. The generalized NSE includes fiber loss and dispersion slope and is characterized by equation one (1), which follows:

$$\frac{\partial A}{\partial z} + \frac{i}{2}\beta_2 \frac{\partial^2 A}{\partial t^2} - \frac{1}{6}\beta_3 \frac{\partial^3 A}{\partial t^3} - i\gamma|A|^2 A + \frac{\alpha}{2}A = 0, \quad (1)$$

where A is the signal envelope, z is the distance of transmission, $\beta_2$ is the dispersion parameter (related to the dispersion D through $D=-2\pi c\beta_2/\lambda$) and $\beta_3$ is the dispersion slope parameter (related to the dispersion slope $S \equiv dD/d\lambda$ through $S=4\pi c\beta_2/\lambda^3+4\pi^2 c^2\beta_3/\lambda^4$). The nonlinear parameter $\gamma$ is characterized according to equation two (2) which follows:

$$\gamma = \frac{n_2 \omega_0}{c_0 A_{eff}}, \quad (2)$$

where $n_2$ is the Kerr nonlinear coefficient (set to $2.6 \times 10^{-20}$ m$^2$/W), $\omega_0$ is the angular frequency of the signal, $c_0$ is the speed of light in vacuum and $A_{eff}$ is the effective area of the fiber.

As mentioned above, even though SPM, XPM, and FWM result in the generation of various nonlinear distortions in the optical domain, photodetection of the optical signal can reduce these distortions under certain circumstances. For example, in the case of a zero dispersion fiber and in the absence of optical filtering, a propagating optical signal only acquires a nonlinear phase shift. In such a case, namely the case of a zero dispersion nonlinear fiber, equation (1) is characterized according to equation three (3), which follows:

$$\frac{\partial A}{\partial z} = -\gamma |A|^2 A - \alpha A, \text{ with } A = A_0 \exp(i\phi_{NL}). \quad (3)$$

The phase shift is thus characterized by equation four (4), which follows:

$$\phi_{NL} = \frac{\gamma P(t)[1 - \exp(-\alpha z)]}{\alpha}, \quad (4)$$

where P(t) is the value of launch power at a given time t. As such, with zero dispersion fibers, the effects of SPM, XPM and FWM are all automatically included in the nonlinear phase shift. At all times t the nonlinear phase shift is eliminated by photodetection because photodetection is insensitive to the phase of a detected signal.

Figure 4:
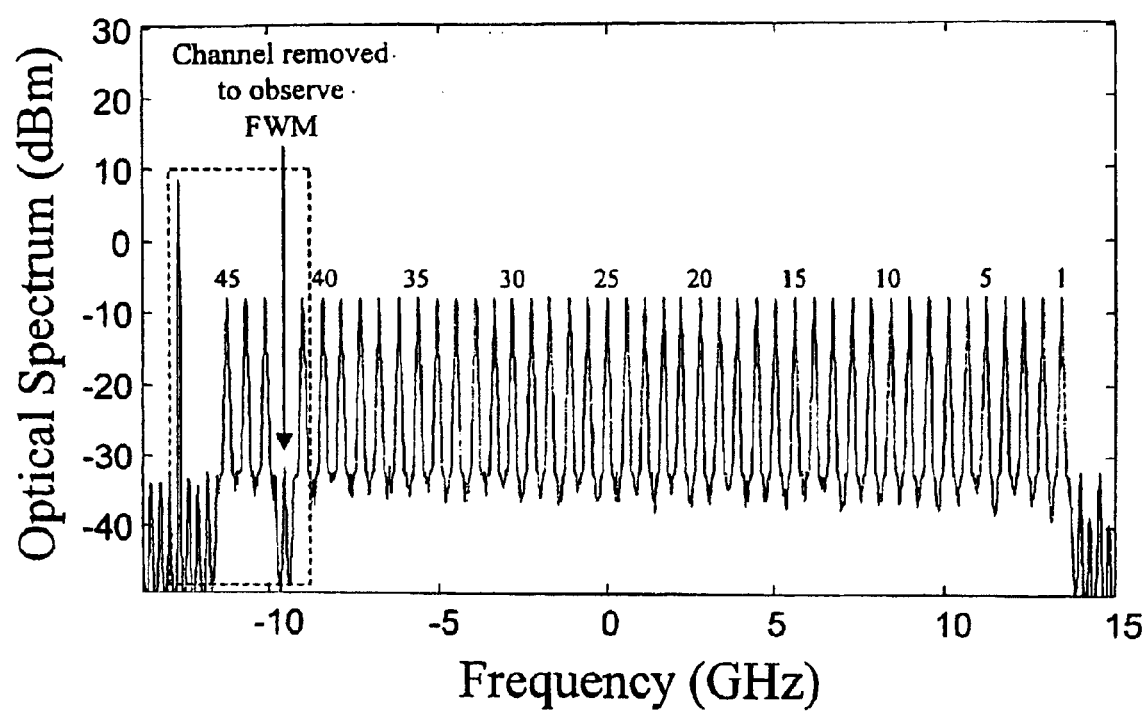
FIG. 4 graphically depicts a full field optical spectrum of an optical signal after transmission over 1 km of conventional fiber.

For example, FIG. 4 graphically depicts a full field optical spectrum (i.e., an optical spectrum including the shared local oscillator 115 and all of the input channels $ch_x$) received at each of the nodes 105 after transmission of a DWDM optical signal centered at 1310 nm over one kilometer of conventional fiber. FIG. 4 graphs the power of the optical signal in dBm versus the frequency in GHz. The zero frequency of FIG. 4 corresponds to the central frequency (1310 nm) of the DWDM optical signal. The dispersion of the transmission fiber was set to zero and the dispersion slope to 0.07 ps/(km-nm²). Optical powers are −6.4 dBm per channel and 8.6 dBm for the co-propagating shared local oscillator 115. Channel 42 has been removed to allow viewing of the optical sideband generated by FWM, the limiting fiber nonlinearity for this case. As evident in FIG. 4, the propagation of the optical signal through the transmission fiber is negatively effected by FWM.

Figure 5:
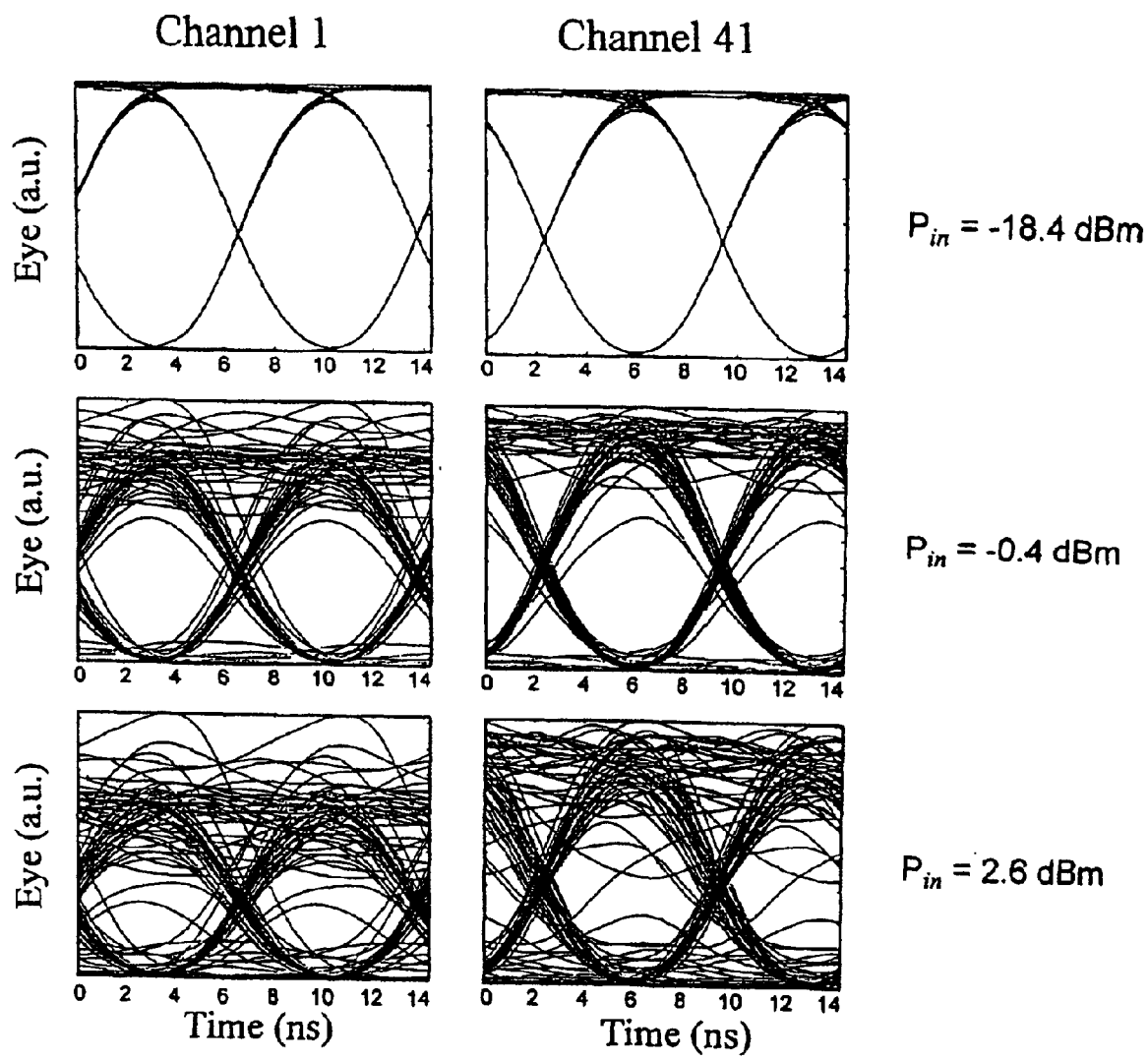
FIG. 5 graphically depicts optical eye diagram of the transmitted optical signal of FIG. 4 for different powers.

FIG. 5 graphically depicts an optical eye diagram of the transmitted optical signal of FIG. 4 for two exemplary channels at three different power levels. The effects of fiber nonlinearity on a propagating optical signal produce waveform distortions that close an optical eye diagram associated with the propagating optical signal. The eye diagram after optical demultiplexing of the channels 1 and 42 are depicted in FIG. 5 for three signal powers. The power of the shared local oscillator is maintained at 15 dB higher than the channel powers $P_{in}$ in all cases. The three channel powers depicted in FIG. 5 include, $P_{in}$=−18.4 dBm, −0.4 dBm and 2.6 dBm. At low signal power ($P_{in}$=−18.4 dBm), fiber nonlinearity is negligible and the eye diagram is completely opened. As $P_{in}$ increases, the eye opening is reduced and eventually becomes completely closed. The closing optical eye diagram reflects the increase in signal distortions experienced by the propagating optical signal as the power increases.

By using photodetection in accordance with the present invention, instead of optical demultiplexing as in FIGS. 4 and 5, the effects of the fiber nonlinearity on a propagating optical signal are substantially reduced at detection.

Figure 6:
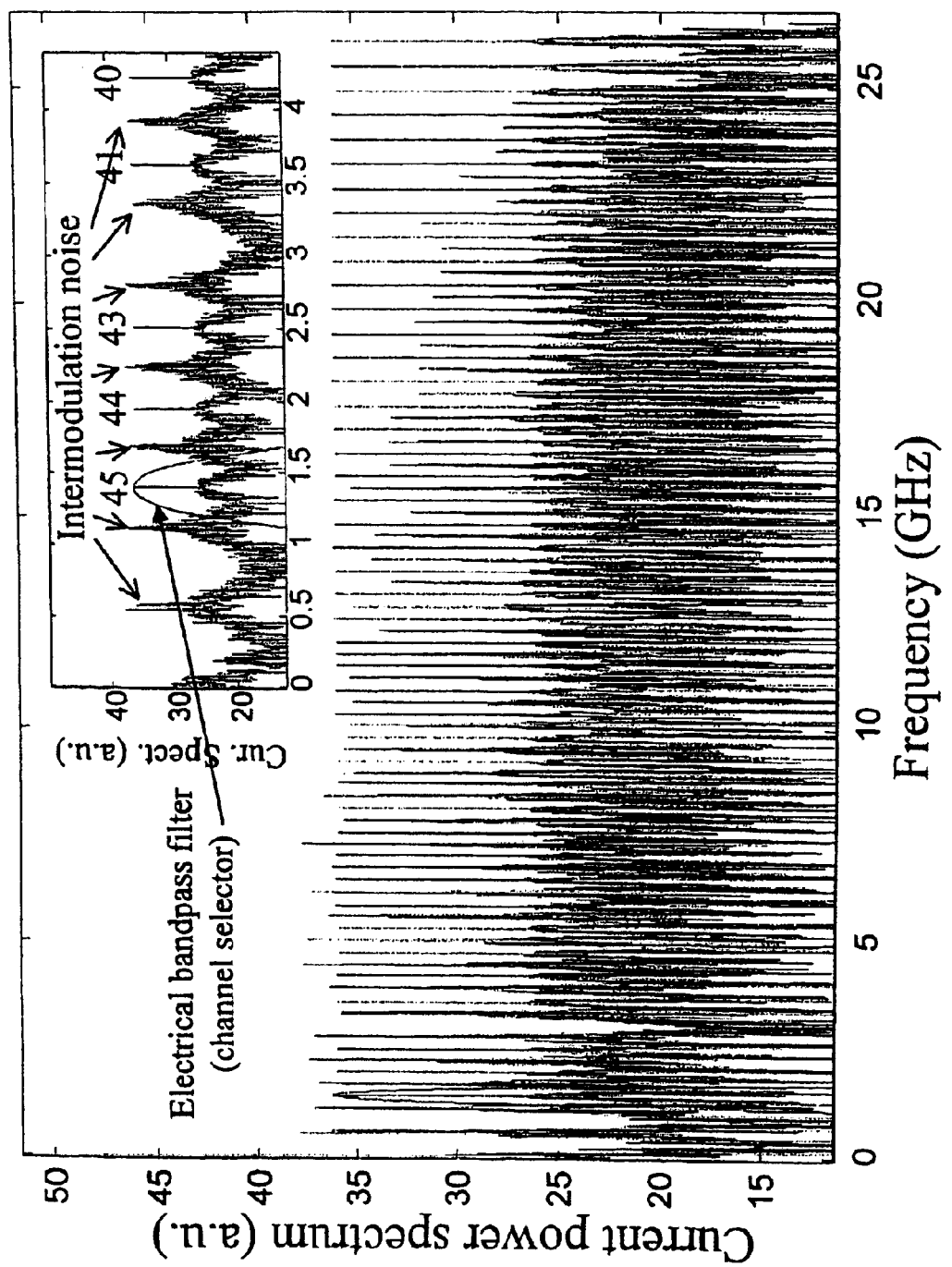
FIG. 6 graphically depicts an electrical spectrum for direct photodetection of the full field of an optical signal in accordance with the present invention.

For example, FIG. 6 graphically depicts an electrical spectrum for direct photodetection of the full field of an optical signal in accordance with the present invention. The current power spectrum of an optical signal in arbitrary units (a.u.) versus the frequency in GHz is graphed in FIG. 6.

Evident is the presence of channels 1 to 45 (with channel 42 removed) resulting from the beating of the optical channels with the shared local oscillator at photodetection as well as the beatings between the channels themselves that generate the intermodulation noise. As described above, the difference of frequency between the channels of the optical signal and the shared local oscillator is chosen such that the intermodulaton noise falls in between the electrical channel locations. The locations of the channels and the intermodulation noise are better depicted in the inset of FIG. 6, focusing on the low frequency region. The absence of FWM noise is evident at the position of the removed channel 42, even though in the optical spectrum of FIG. 4 a FWM sideband is present at the channel 42 location.

Figure 7:
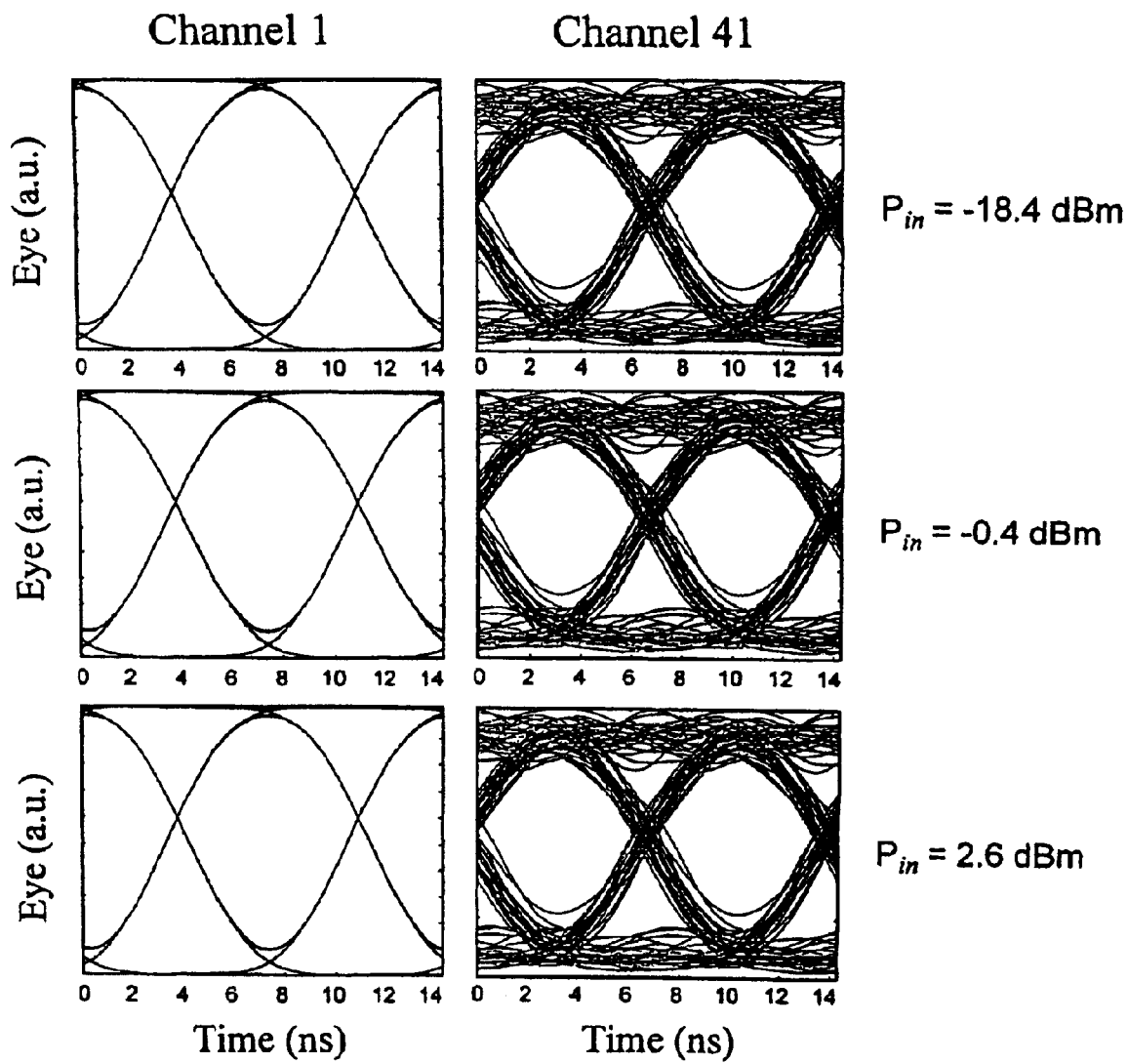
FIG. 7 graphically depicts the corresponding electrical eye diagram for the electrical spectrum of FIG. 6.

FIG. 7 graphically depicts a corresponding electrical eye diagram for the electrical spectrum of FIG. 6 using the same channels and signal powers as in FIG. 5. That is, FIG. 7 depicts corresponding electrical eye diagrams of the optical eye diagrams of FIG. 5. The eye diagram after photodetection of the channels 1 and 42 are depicted in FIG. 7 for three signal powers. The power of the local oscillator is maintained at 15 dB higher than the signal powers $P_{in}$ in all cases, $P_{in}$=−18.4 dBm, −0.4 dBm and 2.6 dBm. Each of the channels is detected by using a $5^{th}$-order 280-MHz Bessel bandpass filter followed by an envelope detector and a $5^{th}$-order 98-MHz Bessel filtered to generate the eye diagram. At low power, fiber nonlinearity has no effect. The distortions in the eye diagrams of the channels in FIG. 7 are due to crosstalk from intermodulation noise that is not completely eliminated by electrical filtering. The higher power eye diagrams ($2^{nd}$ and $3^{rd}$ rows) are substantially similar to the low power eye diagram depicting the suppression of the effects of fiber nonlinearity that normally arise at high channel powers. This suppression is possible by using direct photodetection of an optical signal copropagated with a local oscillator in accordance with the present invention. As the power per channel increases, substantially no changes in the eye diagrams are observed with the direct photodetection technique in contrast to the completely closed eye diagrams of FIG. 5 where optical demultiplexing was used.

The inventors determined that to suppress the effects of SPM, XPM and FWM in other low dispersion fibers, a fiber must comprise a sufficiently low dispersion or be sufficiently short, such that the nonlinear distortion imparted on a propagating optical signal along the low dispersion fiber is imprinted primarily on the optical field phase of the optical signal. Furthermore, the bandwidth of a photodetector must be large enough such that all transmitted channels can be simultaneously detected by the photodetector with no need for optical filtering to separate the dense WDM channels. Optical filtering would suppress some of the optical components of a signal's optical spectra leading to phase-intensity conversion imprinted in the electrical domain.

Thus, using low dispersion fiber or sufficiently short high-dispersion fibers and photodetection of an optical signal co-propagated with an oscillation signal (e.g., a local oscillator), in accordance with the present invention, suppresses nonlinear distortions from SPM, XPM, and FWM experienced by a propagating optical signal in the low dispersion fiber. As such, the power margin of the passive star LAN 100 is increased. That is, typically an increase in the power of a system increases the effects of FWM and increases the distortion of a propagating optical signal in a low dispersion fiber. Because the effects of SPM, XPM, and FWM are suppressed in the present invention, the per channel power of a system in accordance with the present invention may be higher before experiencing signal distortions equivalent to those in a system implementing optical filtering. Additionally, the channel spacing of a system in accordance with the present invention may be substantially smaller than the channel spacing of a system implementing optical filtering because of the suppression of FWM.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for suppressing nonlinear distortions in an optical signal associated with the propagation of said optical signal through a nonlinear transmission medium, comprising:

propagating said optical signal through a nonlinear transmission medium, said nonlinear transmission medium comprising a sufficiently low dispersion such that a nonlinear distortion imparted on said propagating optical signal by said nonlinear transmission medium is imprinted primarily on an optical field phase of said optical signal; and converting said propagated optical signal to an electrical signal such that the optical field phase information of said optical signal is not translated into the electrical domain.

2. The method of claim 1, wherein said optical signal is a wavelength-division-multiplexed (WDM) optical signal and an oscillating signal is co-propagated with said optical signal through said nonlinear transmission medium.

3. The method of claim 2, wherein the channel spacing of said WDM optical signal is equal to four times the bit rate of said WDM optical signal and the frequency of said oscillating signal is ten times the bit rate of said WDM optical signal lower than the frequency of the lowest frequency optical channel of said WDM optical signal.

4. The method of claim 3, wherein a power penalty due to linear crosstalk is substantially negligible.

5. The method of claim 1, wherein said nonlinear distortion is a distortion selected from the group consisting of self-phase modulation, cross-phase modulation, and four-wave mixing.

6. The method of claim 1, wherein said transmission medium comprises a low dispersion optical fiber.

7. The method of claim 1, wherein said transmission medium comprises a short, high dispersion optical fiber.

8. The method of claim 1, wherein said converting comprises photodetection of said optical signal, wherein the bandwidth of said photodetection comprises a bandwidth inclusive of all of the wavelengths of said optical signal.

9. A system for suppressing nonlinear distortions in a WDM optical signal associated with the propagation of said optical signal through a nonlinear transmission medium, comprising:

an optical oscillator for producing an optical oscillation signal;

at least one nonlinear transmission medium, for propagating said optical oscillation signal and said WDM optical signal, said nonlinear transmission medium comprising a sufficiently low dispersion such that a nonlinear distortion imparted on said propagating WDM optical signal by said nonlinear transmission medium is imprinted primarily on an optical field phase of said WDM optical signal;

at least one optical-to-electrical converter for converting said propagated WDM optical signal to a respective electrical for each channel of said WDM optical signal, such that the optical field phase information of said WDM optical signal is not translated into the electrical domain, said optical-to-electrical converter comprising a bandwidth inclusive of all of the wavelengths of said WDM optical signal; and at least one electrical bandpass filter for electrically filtering selected ones of the channels of said converted electrical signal at a respective intermediate frequency of each of said selected channels.

10. The system of claim 9, wherein said transmission medium comprises a low dispersion optical fiber.

11. The system of claim 9, wherein said transmission medium comprises a short, high dispersion optical fiber.

12. The system of claim 9, wherein said at least one optical-to-electrical converter comprises a photodetector.

13. The method of claim 2, further comprising, electrically filtering selected ones of the channels of said converted electrical signal at a respective intermediate frequency of each of said selected channels.

14. The method of claim 13, wherein said filtering substantially eliminates intermodulation noise in said filtered electrical signal, said intermodulation noise occurring between the respective intermediate frequencies of said channels.

15. The method of claim 13, further comprising amplifying each of the filtered channels.

16. The method of claim 13, further comprising recovering transmitted data within each of the filtered channels.

17. The method of claim 16, wherein said data recovery is performed at the frequency of said oscillating signal.

18. The system of claim 9, further comprising at least one respective amplifier for amplifying each of the filtered channels.

19. The system of claim 9, further comprising at least one respective detector for recovering transmitted data within each of the filtered channels.

20. The system of claim 19, wherein said at least one respective detector comprises an envelope detector.

* * * * *